United States Patent [19]

Parry-Williams

[11] Patent Number: 5,297,836
[45] Date of Patent: Mar. 29, 1994

[54] MOTOR CAR CHASSIS STRUCTURE

[75] Inventor: Daniel Parry-Williams, Banbury, United Kingdom

[73] Assignee: Jaguar Cars Limited, United Kingdom

[21] Appl. No.: 906,799

[22] Filed: Jun. 30, 1992

[30] Foreign Application Priority Data

Jul. 3, 1991 [GB] United Kingdom ............... 9114433

[51] Int. Cl.$^5$ ............................................. B62D 25/08
[52] U.S. Cl. ..................................... 296/203; 296/191;
296/901; 52/275; 52/284; 403/231; 403/267;
403/381
[58] Field of Search ................. 296/187, 191, 203, 29,
296/30, 900, 901; 52/275, 284, 593, 594;
403/231, 253, 263, 267, 381

[56] References Cited

U.S. PATENT DOCUMENTS

| | | | |
|---|---|---|---|
| 3,591,212 | 7/1971 | Rhyne | 403/381 X |
| 3,968,989 | 7/1976 | Schippers | 296/901 X |
| 4,025,215 | 5/1977 | Murdock et al. | 403/381 |
| 4,173,287 | 11/1979 | Kumakawa | 403/381 X |
| 4,493,582 | 1/1985 | Drabsch | 403/267 X |
| 4,912,826 | 4/1990 | Dixon et al. | 296/901 X |
| 5,150,944 | 9/1992 | Yoshida et al. | 296/203 |

FOREIGN PATENT DOCUMENTS

| | | |
|---|---|---|
| 2054915 | 5/1971 | France . |
| 361203 | 3/1962 | Switzerland . |
| 2180202 | 3/1987 | United Kingdom . |
| 2220724 | 1/1990 | United Kingdom . |

Primary Examiner—David M. Mitchell
Assistant Examiner—Andrew C. Pike
Attorney, Agent, or Firm—Davis, Bujold & Streck

[57] ABSTRACT

A motor car structure is built up from flat panels joined together, each panel comprising two mutually parallel spaced apart structural skins braced with respect to each other by a core of expanded material united to both skins. Each joint between two panels comprises a series of integral projections formed on a first panel by cutting the panel to a required shape and recesses in the second panel corresponding to the projections. The projections are inserted and bonded into the recesses by means of an adhesive.

10 Claims, 4 Drawing Sheets

MOTOR CAR CHASSIS STRUCTURE

BACKGROUND TO THE INVENTION

The invention relates to motor car structures.

Racing cars and other high performance light-weight motor cars which may be sports-racing cars or road going sports cars incorporate a basic vehicle structural element or chassis which is normally referred to as a tub. The tub normally incorporates a floor, sides, front and rear bulkheads and possibly extensions of some of these elements to carry engines, suspensions, transmissions or other essential parts of the vehicle. In some cases, the tub may also incorporate a roof in which case the sides have to be relatively low to permit driver access.

One established material for manufacture of a tub is aluminium or other light metal sandwich structure. Sandwich material incorporates two skins united by a core of expanded material. One popular sandwich material is known as honeycomb material and has a core constituted by a hexagonal matrix of a material which may be the same as or different from that of the skins. The established procedure for joining together flat sandwich panels to form a tub is by means of angle section strip material bonded and rivetted to at least one skin of each of the panels being joined.

Joins of this kind add weight to the structure, can result in weak points in the structure, are time consuming to assemble and require accurate positioning of rivet holes in the panels and strips.

A more recent development has been to build tubs with a sandwich structure by laying one skin of fibre-resin composite material on a former, applying a sandwich core to the first skin and subsequently laying a second composite skin over the core. With a suitable former, the floor, sides, bulkheads and other parts of the tub can be formed integrally, thus reducing or even avoiding the requirement for joints between individual panels.

Manufacture of a tub in this way is very labour intensive and the cost can amount to several times that of a corresponding tub manufactured from flat sandwich panels joined together.

SUMMARY OF THE INVENTION

An objective of the present invention is to provide a motor car structure which can be built from flat preformed sandwich panels joined together in an effective manner.

The invention is concerned in particular with a motor car structure comprising flat panels joined together, each panel comprising two mutually parallel spaced apart structural skins, braced with respect to each other by a core of expanded material united to both skins, the panels being joined together by adhesive. The invention is characterised in that a joint between two panels comprises a series of integral projections formed on a first panel by cutting the panel to a required shape, recesses in the second panel corresponding to the projections, the projections being inserted into the recesses and bonded into the recesses by means of an adhesive.

Preferably the roots between the projections are also bonded to a skin of the second panel between the recesses.

Preferably the projections are formed by cutting the panel across its whole width, thereby incorporating two skins and the core in each projection, the recesses extending through a first skin and into the core of the second panel but not through the second skin thereof.

Preferably the recesses extend the whole depth of the core and the projections contact and are bonded to the second skin while the roots between the projections are bonded to the first skin.

The adhesive may be applied to the whole lengths of the projections and the whole lengths of roots between the projections such that the projections become bonded to the second skin in the base of the corresponding recesses while the roots between the projections become bonded to the remaining parts of the first skin between the recesses.

The recesses may be formed at an edge of the second panel. The projections may extend across the whole depth of the first panel, the roots between the projections being formed by cutting away only one skin and the whole of the core to leave the second skin extending between the projections, the recesses extending through one skin and the whole of the depth of the core but not through the second skin.

With one variant, the first panel has a relatively thin depth compared with the second panel, recess in the second, relatively thick, panel extend through a first skin and only partly through the core, the projections are bonded to the core and the roots between the projections are bonded to the remaining parts of the first skin between the recesses.

BRIEF DESCRIPTION OF THE DRAWINGS

An embodiment of the invention will now be described by way of example only with reference to the accompanying drawings in which.

DESCRIPTION OF A PREFERRED EMBODIMENT

Figure 1:
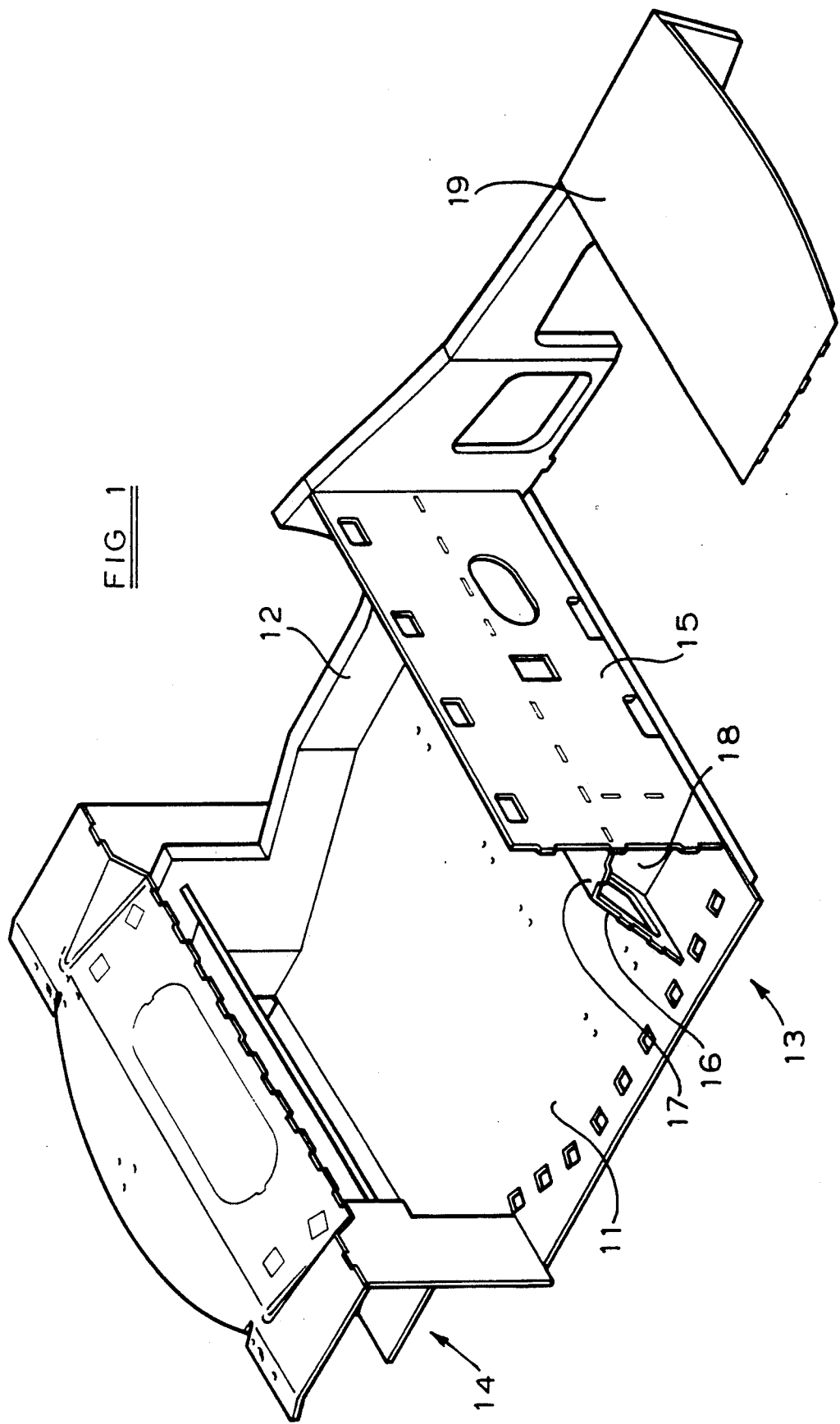
FIG. 1 is a diagrammatic perspective view of a partly completed tub constructed in accordance with the present invention.

FIG. 1 broadly illustrates the nature of a tub and gives a general indication of joints between panels constructed in accordance with the invention. The tub incorporates a floor panel 11. Two side panels 12, only one of which is shown in the interests of clarity, are arranged one to each side of the vehicle. All of the panels including panels 11 and 12 are made from aluminium honeycomb material incorporating two parallel flat aluminium skins spaced apart by and united to an aluminium alloy hexagonal honeycomb matrix. The design of the vehicle requires that the side panels 12 are closer together at the front and rear of the vehicle than they are in the region of the driver's cab and floor panel 11. Bends are incorporated in the flat panel by cutting part way through the panel, bending the panel along the partial cut line and then reinforcing the bend, particularly the skin which has had to be cut through to provide the bend. In this way, the side panel in effect becomes a series of smaller flat panels between the bends.

The driver's cockpit area in the car lies between a rear bulkhead assembly 13 and a front bulkhead assembly 14. The rear bulkhead assembly comprises a vertical bulkhead 15, an inclined bulkhead 16 referred to as a seat bulkhead because it supports the seat back of the car, a horizontal panel 17 joining the top of panel 16 to a central region of panel 15 and a longitudinal vertical panel 18 referred to as a battery bulkhead. In the completed vehicle its battery is positioned in the space defined by a side panel (not shown) and panels 11, 15, 16, 17 and 18. The front bulkhead assembly 14 is similarly made up from a series of panels arranged in a configuration that provides suitable structural strength, space for the driver's legs and mounting points for functional parts of the vehicle such as the steering column, steering rack and front suspension. This structure is not described in detail because the exact configuration of the tub as a whole is incidental to the invention.

In some cars of tub construction, the tub ends at the vertical bulkhead 15 of the rear bulkhead assembly 13 and a stressed engine/transmission unit is secured directly to the bulkhead. The rear suspension and other functional parts of the vehicle are then mounted on the engine/transmission assembly. In the example described here, the side panels 12 extend rearward from the vertical bulkhead 15 of the rear bulkhead assembly 13 and are joined together by a further horizontal panel 19.

The invention is concerned particularly with the nature of joints between panels in a motor car tub structure as shown in FIG. 1. Details of such joints will now be explained.

Figure 2:
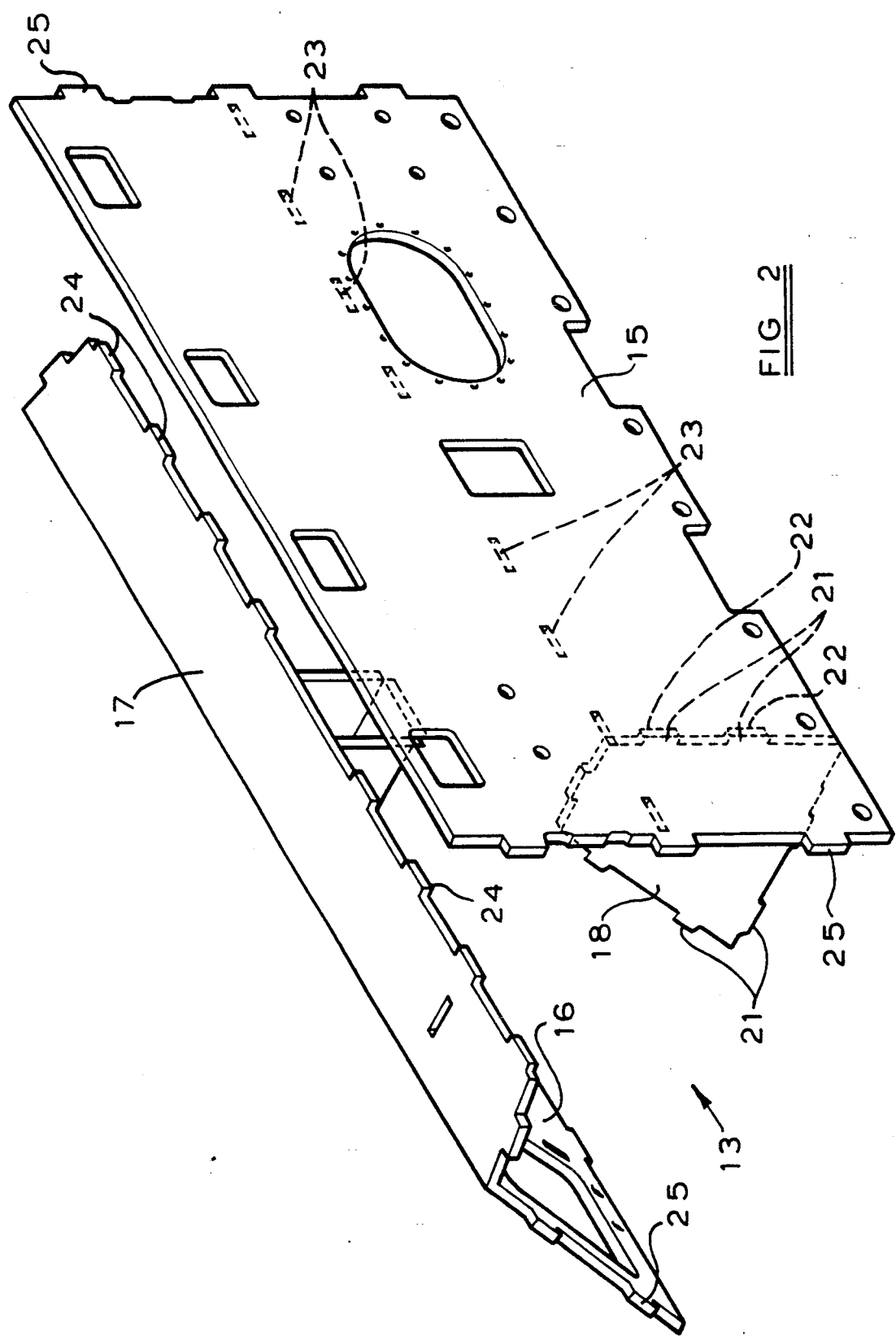
FIG. 2 is a more detailed perspective representation of a small number of panels being joined together to form part of a tub.

FIG. 2 shows the rear bulkhead assembly 13 on a larger scale. The joint between panels 15 and 18 is typical. Panel 18 incorporates two projections 21 on each of its front, rear and lower edges and a single projection on its upper edge. Projections 21 are shown engaged in corresponding recesses 22 in the rear bulkhead 15. In a similar way, a horizontal row of recesses 23 is provided across the central region of bulkhead 15 to receive projections 24 at the rear edge of panel 17. Panels 15, 16 and 17 also have projections such as 25 at their outer ends for engagement in corresponding recesses in a side panel 12.

Figure 3A:
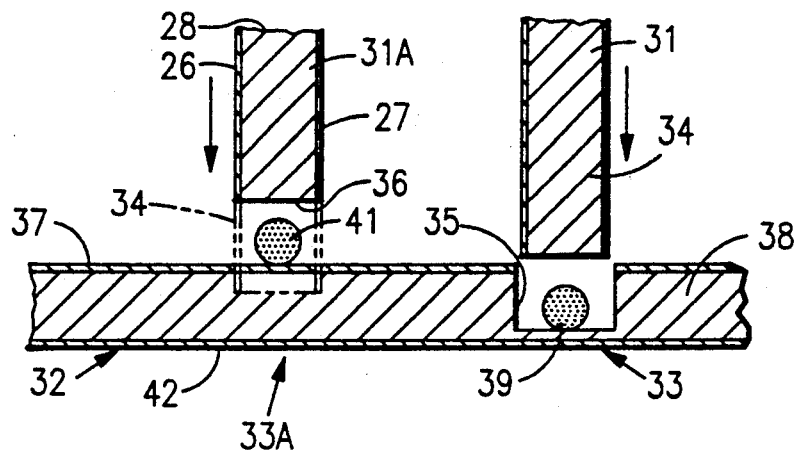
FIGS. 3A and 3B are each sectional views of two joints about to be assembled together.
Figure 3B:
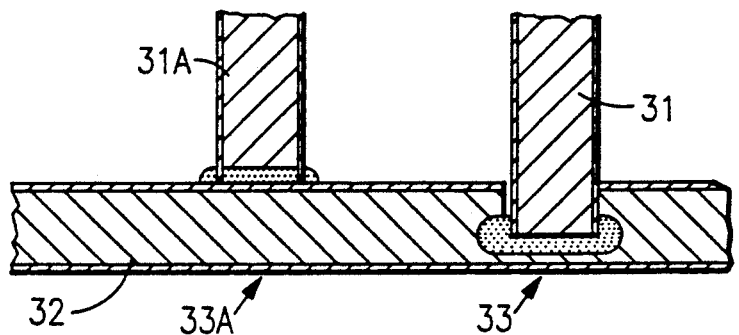

FIGS. 3A and 3B show still further details of typical joints. These Figures are illustrative of joints as such and do not correspond to particular panels in the tub shown in FIGS. 1 and 2. A first panel 31 is joined to a second panel 32 to form a joint 33. The first panel 31 has aluminium alloy skins 26 and 27 and an aluminium alloy honeycomb core 28 and the second panel has skins 37 and 42 and a core 38. By way of illustration, a cross sectional view through a different part of an identical joint 33A is shown between panels 31A and 32. Joint 33 shows a cross sectional view at a projection 34 whereas joint 33A shows the situation in a region between two projections. FIG. 3A shows the two joints prior to assembly and FIG. 3B shows the corresponding joints after assembly. The joint 33 incorporates a projection 34 in the form of a rectangular block corresponding to a projection 21 from FIG. 2 about to be inserted within a recess 35. Similarly, at joint 33A, the root 36 represented by the region between two adjacent projections 34 or the space beyond the last projection is about to come into contact with an upper skin 37 of panel 32.

FIG. 3 shows that recess 35 is substantially the whole depth of the core 38 as well as extending through skin 37. When core 38 is of honeycomb material it is in order to leave a small depth of the core at the base of the recess 35 as will be explained.

Prior to final assembly, beads 39 and 41 of adhesive are laid on the panel 32 along the whole of the line of the joint. These may be separate beads applied within the recesses and between the recesses or may be a continuous bead which runs up and down over the edge of the recess. On final assembly as the panels are pushed from the position shown in FIG. 3A to the position shown in FIG. 3B, the adhesive spreads and takes up a position to give effective bonding between the panels. The quantity of adhesive in the bead should be sufficient to ensure that it spreads beyond the edges of panels 31 and 31A to ensure that the skins of these panels are embedded in the adhesive. One factor determining the requirement for the adhesive is the nature of the surface of the core at an exposed edge of the bead. Also, if a small amount of core has been left at the base of the recess, there should be sufficient adhesive to permeate the remaining core and bond effectively with the adjacent lower skin 42. Similarly, at joint 33A, there must be sufficient adhesive to spread and embed both skins.

Figure 4A:
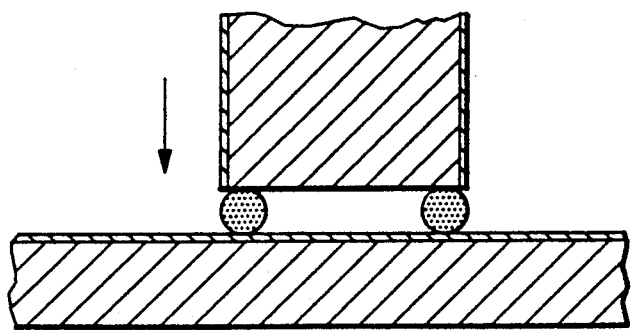
FIGS. 4A and 4B are corresponding views of a joint between deeper panels.
Figure 4B:
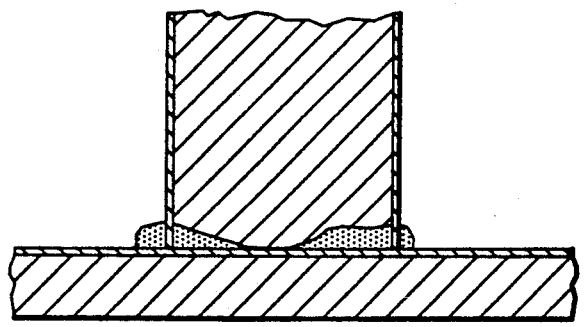

FIGS. 4A and 4B show part of a joint 43 corresponding generally to joint 33A but for a greater depth of sandwich material. The arrangement of FIGS. 3A and 3B is suitable for panel depths of the order of 15 mm. However, for panels with a depth of the order of 50 mm, the quantity of adhesive required in the arrangement of. FIGS. 3A and 3B would be excessive. For this in FIGS. 4A and 4B; two separate beads are shown, one adjacent each skin of the panel. FIG. 4A shows the situation when the panels are about to be joined together and FIG. 4B shows the arrangement after joining. A similar technique to that shown in FIGS. 4A and 4B may also be employed within a recess.

Where the first panel with its projections is of a relatively thin depth compared with the depth of the second panel with the projections, it is unnecessary for the recesses to extend the whole depth of the second panel. In such a case, the roots between projections are joined to an upper skin as previously described while the projections are bonded into the recesses by bonding the projections to the core of the second panel.

Where panels are to be joined at inclined angles instead of at a right angle, the recesses should be correspondingly inclined. If the basic recess cutting equipment is only capable of operating perpendicular to the surface of a panel, the recess should be cut undersize initially and then cut or pushed back manually to the desired size at the required angle.

When joining two panels edge to edge at a right angle to each other, for example as shown for panels 12 and 19 in FIG. 1, the arrangement of projections and recesses may be as described with reference to FIGS. 2, 3A and 3B but with the recesses formed at an edge of the panel. However, this leaves some core exposed and does not achieve a double skin to skin bonding between the panels in the region between the recesses.

Figure 5:
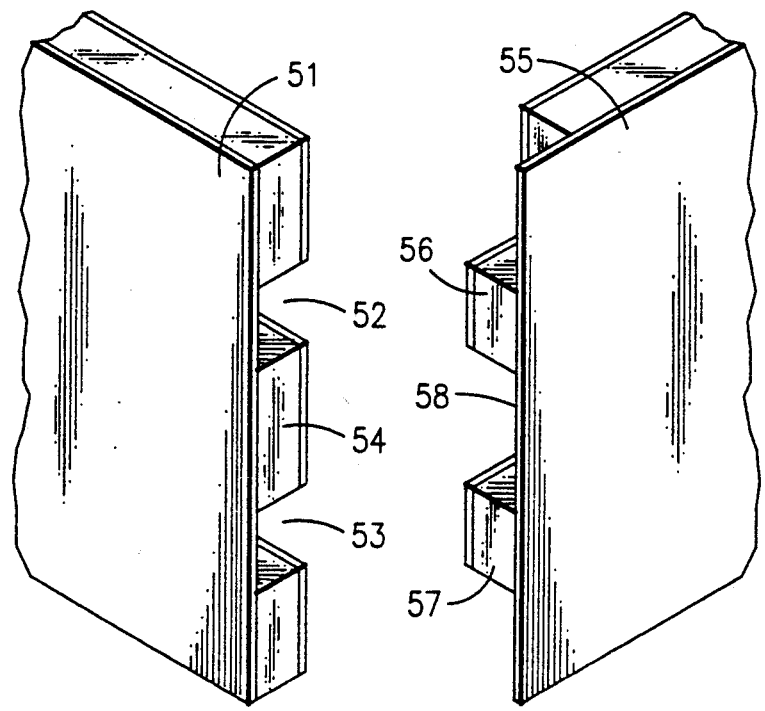
FIG. 5 is a perspective view of two panels about to be joined together at their edges.
Figure 6:
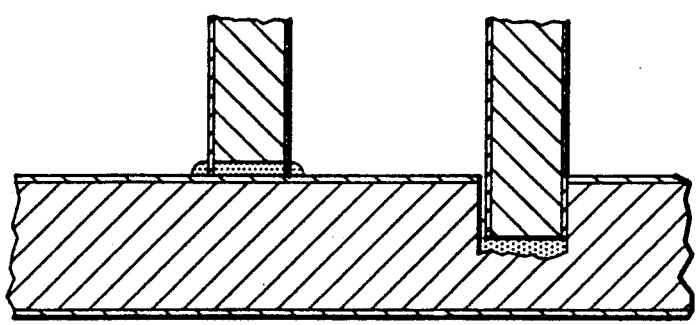
FIG. 6 is a view of a joint between panels of different thicknesses.
Figure 7:
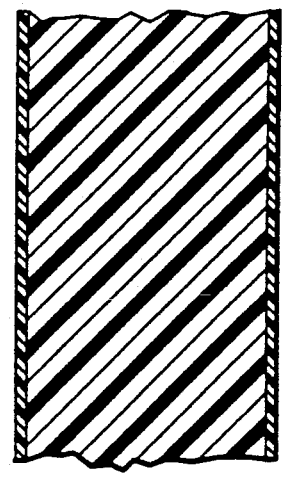
FIG. 7 is a partial diagrammatic sectional view showing the skin and core as a resinous material.

A preferred alternative is illustrated in FIG. 5. Panel 51 is shown as having two recesses 52 and 53 in its edge 54. Panel 55 has two corresponding projections 56 and 57 for engagement in recesses 52 and 53. Instead of cutting the profile of the panel 55 through its whole depth to form the projections 56 and 57, the panel has been cut through only one skin and the whole of the core, leaving part of the other skin as a web 58 extending between the projections 56 and 57 and extending beyond these projections.

When the two panels are brought together, the projections fit into the recesses and the web 58 closes off what would otherwise be exposed core in panel 51. The outer skins of both panels thus come into juxtaposition and can be bonded one to the other. This arrangement described with reference to FIG. 5 can be adapted to panels of different thicknesses.

Once a tub as illustrated in FIG. 1 or parts of a tub as illustrated in FIG. 2 have been assembled by means of joints such as described in FIGS. 3A, 3B, 4A, 4B and 5, the assembly should be subjected to an environment in which the adhesive cures effectively. This may require no more than maintaining an ambient temperature of the order of 20° C. or could involve placing the assembly in a higher temperature environment, depending on the properties of the adhesive chosen.

Instead of aluminium, other light metals such as titanium could be used. As a further alternative, the panels could be constructed from skins of resin-fibre composite and a core of expanded resin material or of expanded resin-fibre composite. The metal and resin or composite materials could be mixed, using either material for the skins and the other material for the core.

I claim:

1. A motor car structure comprising first and second flat panels joined together; each panel comprising first and second mutually parallel spaced apart structural skins, and a core of expanded material united to both the first and second skins and bracing the first skin with respect to the second skin of each panel; a joint between the first and second panels forming part of the structure comprising a plurality of integral projections formed on the first panel by cutting the first panel to a required shape, a corresponding plurality of recesses in the second panel corresponding to the projections, the projections being inserted into the recesses, and adhesive bonding the projections into the recesses; wherein roots defined between said projections are bonded to one skin of the second panel between the recesses.

2. A structure according to claim 1 wherein the projections are formed by cutting the first panel across its whole width, thereby incorporating parts of said first and second skins and of the core of the first panel in each projection and wherein the recesses extend through the first skin and into the core of the second panel but not through the second skin thereof.

3. A structure according to claim 2 wherein the recesses extend the whole depth of the core of the second panel and the projections are bonded to the second skin of the second panel while the roots defined between said projections are bonded to the first kin of the second panel.

4. A structure according to claim 3 wherein the adhesive is applied to the whole lengths of the projections and the whole lengths of the roots between the projections such that the projections become bonded to the second skin of the second panel in the base of the corresponding recesses and the roots between the projections become bonded to remaining parts of the first skin of the second panel between the recesses.

5. A structure according to claim 1 wherein the recess are formed at an edge of the second panel.

6. A structure according to claim 5 wherein the projections extend across the whole depth of the first panel and the roots between the projections are formed by cutting away only the first skin of the first panel and the whole of the core of the first panel to level the second skin of the first panel extending between the projections and wherein the recesses extend through the first skin and the whole of the depth of the core of the second panel but not through the second skin of the second panel.

7. A structure according to claim 1 wherein the first panel is thinner than the second panel, the recesses in the second panel extend through the first skin of the second panel and only partly through the core of the second panel and wherein the projections are bonded to the core of the second panel and the roots between the projections are bonded to remaining parts of the first skin of the second panel between the recesses.

8. A structure according to claim 1 wherein each skin is formed from metal sheet.

9. A structure according to claim 1 wherein each skin is a resin-fibre composite.

10. A structure according to claim 1 wherein the core is of expanded resinous material or expanded resin-fibre composite.

* * * * *